(12) United States Patent
Schweier (10) Patent No.: US 8,301,747 B2
(45) Date of Patent: Oct. 30, 2012

(54) METHOD AND COMPUTER SYSTEM FOR OPTIMIZING A LINK TO A NETWORK PAGE

(75) Inventor: René Schweier, Stuttgart (DE)

(73) Assignee: Hurra Communications GmbH, Stuttgart (DE)

( * ) Notice: Subject to any disclaimer, the term of this patent is extended or adjusted under 35 U.S.C. 154(b) by 49 days.

(21) Appl. No.: 12/926,398

(22) Filed: Nov. 16, 2010

(65) Prior Publication Data

US 2011/0087563 A1    Apr. 14, 2011

Related U.S. Application Data

(63) Continuation of application No. 10/861,414, filed on Jun. 7, 2004, now abandoned.

(30) Foreign Application Priority Data

Jun. 7, 2003  (DE) .................................. 103 25 998

(51) Int. Cl.
    *G06F 15/173* (2006.01)
(52) U.S. Cl. ........ 709/223; 709/205; 709/224; 709/245; 707/1; 707/2; 707/102; 705/27.1
(58) Field of Classification Search .................. 709/205, 709/223, 224, 245; 707/1, 2, 200, 797, 102; 705/10, 14.41, 27.1
    See application file for complete search history.

(56) References Cited

U.S. PATENT DOCUMENTS

| | | | | |
|---|---|---|---|---|
| 5,870,559 A * | 2/1999 | Leshem et al. | ................. | 709/224 |
| 5,958,008 A * | 9/1999 | Pogrebisky et al. | .......... | 709/223 |
| 5,960,409 A * | 9/1999 | Wexler | ........................ | 705/14.41 |
| 6,144,962 A * | 11/2000 | Weinberg et al. | ...................... | 1/1 |
| 6,237,006 B1 * | 5/2001 | Weinberg et al. | ............. | 707/797 |
| 7,200,677 B1 * | 4/2007 | Allen et al. | .................... | 709/245 |
| 7,228,360 B2 * | 6/2007 | Allen et al. | .................... | 709/245 |
| 7,275,114 B2 * | 9/2007 | Allen et al. | .................... | 709/245 |
| 2002/0059604 A1 * | 5/2002 | Papagan et al. | ................. | 725/51 |
| 2002/0099605 A1 * | 7/2002 | Weitzman et al. | ............. | 705/14 |
| 2002/0147805 A1 * | 10/2002 | Leshem et al. | ................ | 709/223 |
| 2003/0046311 A1 * | 3/2003 | Baidya et al. | ................. | 707/200 |
| 2003/0097408 A1 * | 5/2003 | Kageyama et al. | ........... | 709/205 |
| 2003/0110158 A1 * | 6/2003 | Seals | ................................. | 707/1 |
| 2003/0191737 A1 * | 10/2003 | Steele et al. | ....................... | 707/1 |
| 2003/0208472 A1 * | 11/2003 | Pham | ................................ | 707/2 |
| 2004/0083127 A1 * | 4/2004 | Lunsford et al. | ................ | 705/10 |
| 2004/0133551 A1 * | 7/2004 | Linstedt | ........................... | 707/1 |
| 2004/0260722 A1 * | 12/2004 | Allen et al. | .................... | 707/102 |
| 2005/0080908 A1 * | 4/2005 | Allen et al. | .................... | 709/228 |
| 2005/0256848 A1 * | 11/2005 | Alpert et al. | ...................... | 707/3 |
| 2006/0026194 A1 * | 2/2006 | Bhushan et al. | ............. | 707/102 |

\* cited by examiner

*Primary Examiner* — Thu Ha Nguyen
(74) *Attorney, Agent, or Firm* — Paul Vincent (57) ABSTRACT

To optimize a link (221) which refers to a first network page (11) of a first server (10*a*) and which is displayed on a second network page (21) of a second server (20), the link is automatically assessed in dependence on link (22) activation by a user (50), wherein the assessment is carried out in dependence on the frequency of activation of the link (22) by any user. A static link is examined in dependence on the assessment of the link as to whether the display of the link on the second network page (21) should be continued. A dynamic link, which is generated in dependence on at least one predeterminable parameter, is examined in dependence on the assessment of the link (22) as to whether the at least one or another predeterminable parameter should be changed.

10 Claims, 5 Drawing Sheets

METHOD AND COMPUTER SYSTEM FOR OPTIMIZING A LINK TO A NETWORK PAGE

This application is a continuation of Ser. No. 10/861,414 filed Jun. 7, 2004 now abandoned and also claims Paris convention priority to DE 103 25 998.8 filed on Jun. 7, 2003 the entire disclosures of which are hereby incorporated by reference.

BACKGROUND OF THE INVENTION

The invention concerns a method for optimizing a link to a first network page of a first server which is displayed on a second network page of a second server, wherein the second network page is requested by the second server using a client associated with a user;
the second network page is transmitted to the client by the second server;
the user activates the link displayed on the second network page.

The invention also concerns a computer system comprising a first server, a second server, a client associated with a user, at least one link to a network page of the first server which can be displayed on a network page of the second server, and a communications network which provides communication between the first server and the client and between the second server and the client; wherein a network page may be requested from the second server via the client;
the second network page can be transmitted to the client via the second server;
the link shown on the second network page can be activated.

Moreover, the invention concerns a computer program which can be run on a computer, in particular, on a server.

A computer which is connected to the communications network is e.g. called a server and runs software to enable the server to provide certain services. These services may be e.g. providing information or resources (e.g. storage space, calculation capacity or access to a communications network).

The services are typically used by a so-called client. Towards this end, the client transmits a request to the server using a communications network, e.g. the Internet. The server evaluates the incoming request, optionally checks whether the client is authorized to issue the request and transmits information in correspondence with the request or provides the required resources.

Information is often provided by a server to a client in the form of so-called network pages (also called Internet pages or briefly pages).

To describe the content of a network page, a language describing the page is used. The standardized page-describing language HTML (Hypertext Mark up Language) is mainly used today. HTML permits simple description of the content and appearance of a network page in a so-called HTML document. If a client requests e.g. information from a server, the server transmits a HTML document containing the requested information to the client. If the information transmitted to the client via the HTML document is to be displayed to a user, the network page or the HTML document is transmitted to a special computer program (so-called browser) which can interpret HTML documents and display them on a computer monitor using a graphic interface.

The network pages transmitted by the server to the client may already be generated before the client's request and be stored at a suitable location. Such network pages are called static network pages.

Often, a client will place a specific request to the server such that the network pages containing the requested information are dynamically generated by the server. This is the case e.g. when a user uses the client to transmit a request in the form of a search term to a server designed as search engine. The search engine gathers information, which is associated with the search term, in accordance with a predeterminable algorithm on the basis of the search term. Depending on the determined information, a dynamic network page is automatically created by the server and transmitted to the client.

A plurality of clients and servers communicate via the Internet and together form a multi-media information system, the so-called www (world wide web). Network pages available within the www can be addressed via an URL (Uniform Resource Locator). A URL is composed i.a. of the name of the server providing the network page, a register and a name associated with the network page. A URL permits direct selection by a client of the network page associated with this URL. Towards this end, a user enters the URL into a specific input field of the browser e.g. using a keyboard. The client subsequently generates a request to the corresponding server which then transmits the requested network page to the client.

URLs of further network pages or HTML documents can be mentioned within an HTML document. Such URLs are called links or hyperlinks (briefly: link). Links shown on static network pages are referred to below as static links. Analogous thereto, links shown on dynamic network pages are referred to below as dynamic links.

If links are displayed to a user via a browser, the user can select a displayed link and have the network page displayed which corresponds to the selected URL. The selected network page may, in particular, also be located on another server.

A second server is often instructed by a first server to provide a link to a network page of the first server via network pages which are transmitted by the second server. Such a link may e.g. be a so-called advertising banner which advertises a product or services offered by the first server which can be obtained via the first server using a written and/or graphic representation. The link shown on the second network page is thereby typically associated with text, sound and/or graphic elements which are displayed to the user using the browser. The term "link" therefore also comprises the entire information associated with the link.

A product may also, in particular, be information offered by the first server. The product may moreover be an access to a protected storage region provided by the first server, which contains further accessible information. Such information may e.g. be news, stock market prices, as well as other text, sound or image data.

The information transmitted by the second server to the client is often distributed on several network pages, wherein only one first network page is initially transmitted to the client. The client then successively requests one of the further network pages from the second server.

If the second server is a search engine, the first server can instruct the second server to display a link to a network page associated with the first server on a network page generated in dependence on a search term entered by a user.

Under usual circumstances, the higher the number of links which are displayed on a network page transmitted to a client via a second server, the larger the amount of network page data to be transmitted. This increases the load on the communications network. This is further increased if, due to the plurality of links, several network pages are transmitted to the client via the second server. Moreover, a network page containing one or several links requires more storage space on the transmitting second server as well as on the receiving client.

In particular, if the second server is designed as a search engine, the information which is generated by the search engine in dependence on a search term transmitted to the server by the client, consists of a list of links to network pages which are provided by other servers. To increase the relevance of the information and links provided by a search engine in response to a request, this information, links and search terms are conventionally classified through computer linguistic methods and these classes are mutually associated. The search engine selects suitable information and links through association of classified search terms and information on the basis of a search term received by a client.

The number of requests answered by a server depends i.a. on the amount of network page data which is transmitted per request by the server to the requesting client. Static network pages must be read from a storage e.g. by the server. To generate dynamic network pages, the respective content (information) must be read out of the storage and be integrated into the network page. The network pages are then processed in dependence on the layers of a network protocol used for data transmission (e.g. TCP/IP). This means, the larger the amount of data for a request to be transmitted by a server, the lower the available performance of the server for further, imminent requests.

The network pages are transmitted by the server to the client using the communications network. The amount of data which can be transmitted by the communications network per unit time is thereby limited.

The client initially processes a received network page in dependence on the network protocol used and stores the network page in a suitable storage region. The browser will subsequently process the network page such that the information can be displayed on a monitor.

To minimize load on the calculation power and the storage capacities of the server and of the client, and to relieve the communications network through transmission of a minimum data amount, it is desirable to only display links on the network page generated by the search engine which are actually of interest to the client or the user.

The second server typically tends to display the most recent links on its network pages. Since the second server generally charges a fee for displaying the links to the network pages of the first server on its network pages, the first server tends to only permit display of a limited number of links on the network pages of the second server.

To minimize load on the calculation performance of the server and of the client, and on the transmission performance of the communications network and permit optimum utilization thereof through reduction of the amount of network page data, it is therefore the underlying purpose of the invention to only permit display of links or appropriately designed links on a network page of a server which are of interest to a client or user.

SUMMARY OF THE INVENTION

This purpose is achieved in accordance with the invention with a method for optimizing a link to a first network page of a first server, the link being associated with at least one of textual information or graphical information that is related to at least one of a product or a group of products being offered for purchase, the method comprising the steps of:
a) determining a number of activations of the link per user for a plurality of users, each user having received the link together with a second network page from a second server;
b) assessing each user of the plurality of users with respect to at least one criteria, the criteria selected from the group consisting of how long the user is a customer to an online shop that is associated with the first server, a turnover generated by the user and a number of products ordered by the user from the online shop;
c) weighting the number of activations of the link per user for the plurality of users based on the results of step b);
d) assessing the link based on the weighted number of activations of the link determined in step c); and
e) determining, based on the results of step d), for future requests of the second network page, at least one of how the link is to be displayed on the second network page, whether the link is to be displayed on the second network page at all and whether or not at least one search term that is associated with the link or the product should be modified.

In accordance with the invention, the link activated by the user is automatically evaluated, wherein the evaluation is performed in dependence on the frequency of activation of the link by any user. A static link is automatically examined to evaluate whether the link should be further displayed on the second network page. A dynamic link, which is generated in dependence on at least one predeterminable parameter, is automatically examined during evaluation of the link, as to whether or not the at least one and/or another predeterminable parameter should be changed.

The present invention can increase the efficiency of the first server, the second server, the client and of the communications network and thereby of the entire client-server network by considerably reducing the amount of data to be stored and transmitted. The invention proposes a particularly effective type of data processing in a client-server network.

The frequency of activation of the link which refers to the first network page is the frequency of selection of the first network page through the client, if the client was informed through the link to that first network page. This is e.g. always the case when the link is displayed on the client via the browser and when the first network page is requested through activation of the link.

A link which is activated with particular frequency, is an indication therefor, that the network page which represents the target of the link is of high interest to the user. Evaluation of the link on the basis of the determined frequency of activation of a link can determine whether the link shall be further displayed on the second network page or be changed in the future. In consequence thereof, neither the calculation performance of the server and the client, nor the transmission network are unnecessarily loaded through processing, storage and transmission of links which are not of interest to the user.

If a link is shown on the second network page with which text, sound and/or image information is associated, and if the frequency of activation of the link is registered, it is possible to automatically decide whether the link shall be removed from the second network page or whether the type or amount of information associated with the link shall be changed. A text may e.g. be shortened or be replaced by another text or a graphic design may be removed or be replaced by another.

If the second server is designed as a search engine, the second network page is generated in dependence on a search term transmitted by the client. The search term thereby represents e.g. a parameter in dependence on which the second network page is generated. In accordance with the inventive method and depending on the evaluation of the link, it is possible to automatically decide whether the link is displayed again e.g. after repeated request through the search term by a client in case of repeated generation of the second network page.

The parameter may also describe a time period and/or a point in time. It is feasible to display an advertising banner on a network page if this network page is generated within a certain time period or starting from a certain point in time. For example, an advertising banner may be displayed on a network page if this network page was generated between 6 and 7 p.m. Such an advertising banner could e.g. refer to a first network page giving information about leisure time offers in the evening. Automatic evaluation to change the time period in order to increase the acceptance is feasible with the inventive method. It is also feasible to change a graphic design or text formulation of an advertising banner to increase the acceptance, to optimize space requirements on the second network page and/or to reduce the amount of link data and therefore the required storage place and load on the communications network.

The at least one parameter may also describe e.g. a search term associated with the first network page, a time period, frequency, graphic design or text formulation of the link.

In a preferred embodiment, the evaluation is carried out in dependence on at least one process initiated by the user on the first server. This embodiment is advantageous in that the evaluation does not only depend on the frequency of activation of a link but also takes into consideration actions of the user on the first server. A user can thereby be prevented from activating a link (which increases the frequency of activation) and then interrupting the loading of the first network page, which would produce false results.

The process may be e.g. buying a product, requesting a service, information and/or a further network page associated with the first server. These types of processes are particularly suited to indicate actual interest of the user and are therefore particularly suitable to display links in dependence on the interest of the user thereby saving storing space and calculation time while preventing unnecessary load on the communications network.

Source information is preferably automatically stored during activation of the link and the link is evaluated in dependence on the source information. The source information (so-called referer) indicates on which network page an activated link was displayed. The referer of the link which is displayed on the second network page and which refers to the first network page is e.g. the URL associated with the second network page. This information is also transferred during activation of a link. It is thereby possible for the first server to determine that second server which has transmitted the second network page to the client on which the link to the first network page was represented. The first server can thereby moreover differentiate whether a client has directly requested the first network page e.g. through direct selection of the URL associated with the first network page using the browser, or whether the client has requested the first network page through activation of a link shown on the second network page.

The user is preferably automatically evaluated on the basis of the source information and/or user information. Towards this end, the user is advantageously associated with a user ID. A user ID may e.g. be automatically generated by the first server and/or the second server on the basis of information which is transferred by the client associated with the user during inquiry of a network page. The user ID may, in particular, be a characterization of the client, e.g. his/her IP address (Internet Protocol Address). The user ID may also be realized e.g. through a so-called cookie. A cookie is generated by the first and/or second server and is stored at the client. If the client once more requests a network page from the first or second server, the cookie generated by the respective server is transmitted by the client to that server. The first and/or second server can thereby determine which client or user requests a network page producing statistic information concerning the request frequency of a network page by a client or user. This permits the first and/or second server to provide client or user-specific information and, in particular, design the selection and representation of the network page transmitted to the client in a client or user-specific manner. Statistics on the frequency of the network pages requested by a client or user is an example of user information. User information could, in particular, also be called client information.

The user may also be assessed with respect to other criteria. These criteria state e.g. the time period over which a user has been using the services of the first server (customer duration), the amount of information or services exchanged between the first server and the user (turnover), the payment behavior of the user or how many services or how much information were requested by the user (orders).

In a preferred embodiment, the link is assessed in additional dependence on the user identification and/or assessment of the user. This permits particularly precise link assessment. The assessment of a link may e.g. be degraded if it is found out that the link is only activated by users who do not order or order very little from the first server. The assessment of a link may also be degraded if it is found out that this link is activated frequently but only from a small number of various users.

In a preferred further development of the method, the result of the assessment is automatically stored in such a manner that it can be recalled for a specific user. The specific user may e.g. be the operator of the first server. The information may be represented to the specific user on special network pages which are generated by the second server via a so-called port. Such network pages are typically automatically generated by the second server and therefore permit the user to obtain an overview of the assessment of individual links in a particularly user-friendly manner.

In a preferred embodiment, the assessment of the link and/or an examination of the assessment of the link is carried out additionally in dependence on a threshold value which can be predetermined by the specific user. Such a threshold value may e.g. indicate that a link should no longer be shown on the second network page if the number of activations of the link, e.g. by a certain number of users, falls below the predeterminable threshold value. This permits particularly easy influence of the user or of the operator of the first server on the assessment or examination of the assessment of a link.

In a preferred embodiment, wherein the second server is associated with a search engine, the at least one predeterminable parameter is determined by a search term which the user transmits to the search engine. In dependence on the transmitted search term, the second network page which contains the link to the first network page is generated. In dependence on the result of the examination of the link, the search engine is caused to stop showing this link on the generated network page subsequent to a new search request, or to show it in a modified form. This may be performed automatically or manually by the user.

In particular for search engines, the links are shown on the second network page in dependence on requests defined by the search terms. The operator of the first server may be interested to stop showing a link to the first network page on a second network page generated by the second server should examination of the link assessment show that this link is activated e.g. only rarely or produces no considerable turnover.

In a particularly advantageous further development of the method, a product or a product group is associated with the link. The first server can thereby show precise links to individual products or product groups offered by the server, on network pages which can be requested by the second server. If the second server is e.g. a search engine, the latter may show a link to a product offered by the first server or to a network page offered by the first server which contains a description of the product or product group and in dependence on a request defined by the search term. The user can request the network page of the first server associated with this product or product group through activation of the link.

A product group may e.g. be determined using the product branch in which the provider distributing these products is operating. A product group may, in particular, be a major term of arbitrary abstraction. The product group of a certain portable CD-player may e.g. be "small electronic device", "portable HiFi device", "CD-player" or "entertainment electronics". A product group may also largely be any classification of a product made by the operator of the first server. Criteria for such a classification may e.g. be the price or a profit margin. In particular, data from a merchandise information system associated with the first server may also be used for such a classification. A product group may also, in particular, be any predeterminable amount of products.

An identification of the product or product group associated with the link may be transmitted to the first server through activation of the link. The first server can thereby e.g. register the frequency of requests for a certain product or product group through activation of a link. Such an identification may e.g. be a product name or a characteristic number associated with the product. Alternatively, this characteristic is not explicitly transmitted to the first server but a characteristic of the activated link is transmitted to the first server through activation of the link, which determines therefrom (e.g. via a database) the product or product group associated with the link and thereby the products associated with the link.

The link is advantageously additionally assessed in dependence on at least one piece of information with respect to the product associated with the link or the product group associated with the link. Such information is e.g. the availability of a product or a parameter which states whether a product group is currently available as a special offer. This permits a more precise decision as to whether and how a link should be shown on a network page which can be solicited by the second server.

In a preferred embodiment, the at least one piece of information about the product and/or the at least one piece of information about the product group is information from a merchandise information system. Such a merchandise information system preferably provides information about the identification, availability, sales prices, profit portion, turnover achieved, the number of cancellations, the number of returns, the number of product deficiencies, the number of non-payments and/or advertising costs.

This embodiment provides a particularly effective assessment concerning whether and how a link should be displayed on a network page provided by the second server. The invention also permits stoppage of product offerings or entire product groups which are very often ordered using a link shown on the second network page but not paid for or the order of which is very often cancelled. It is also possible to change the design of a link associated with a product group or a product if the demand decreases, i.e. the link is activated less frequently. This may be achieved e.g. by a more attractive graphic design or by adding details relating to the product to the link.

Advertising costs are e.g. costs which must be paid to the second server for the display of the link associated with the product or the product group by the second server. If the advertising costs for a product are relatively high and the profits from this product or the turnover with this product is relatively small, the second server may automatically be caused to stop representation of such a link on network pages available from the second server.

The information with respect to the product and/or the information with respect to the product group is preferably automatically determined by the first server which permits particularly fast performance of the inventive method. The first server may thereby e.g. automatically obtain or request the required information from an (automated) merchandise information system of a provider of the products.

This object is also achieved by a computer system as mentioned above, wherein
  the link can be automatically assessed in dependence on the link activated by the user;
  the assessment can be carried out in dependence on the frequency of activation of the link;
  it is possible to examine in dependence on the assessment of the link whether the representation of the link on the second network page is to be continued if the link is statically shown on the second network page; and
  it is possible to examine in dependence on the assessment of the link whether at least one predeterminable parameter shall be changed if the link on the second network page is dynamically generated in dependence on the at least one predeterminable parameter.

The advantages of the inventive computer system are, in particular, an increase in the efficiency of the overall computer system, since the amount of data to be stored and transmitted is reduced.

The components of the computer system for carrying out the inventive method are advantageously programmed.

The realization of this invention in the form of a computer program is particularly important. The computer program can be run on at least one calculating device or a computer, in particular, on a server, and is programmed to carry out the inventive method. Parts of the computer program may be run on different computers in order to carry out the inventive method. The invention is thereby realized by the computer program, wherein this computer program represents the invention in the same sense as the method for the execution of which, the computer program is suitable.

The computer program is preferably stored on a storage element. A storage element may, in particular, be a Random-Access-Memory, a Read-Only-Memory or a Flash-Memory.

Further features, possible applications and advantages of the invention can be extracted from the following description of embodiments of the invention which are shown in the drawing. All the features described or shown constitute subject matter of the invention either individually or in arbitrary combination irrespective of their combination in the claims or their dependencies and irrespective of their formulation or representation in the description or in the drawing.

DESCRIPTION OF THE PREFERRED EMBODIMENT

Figure 1:
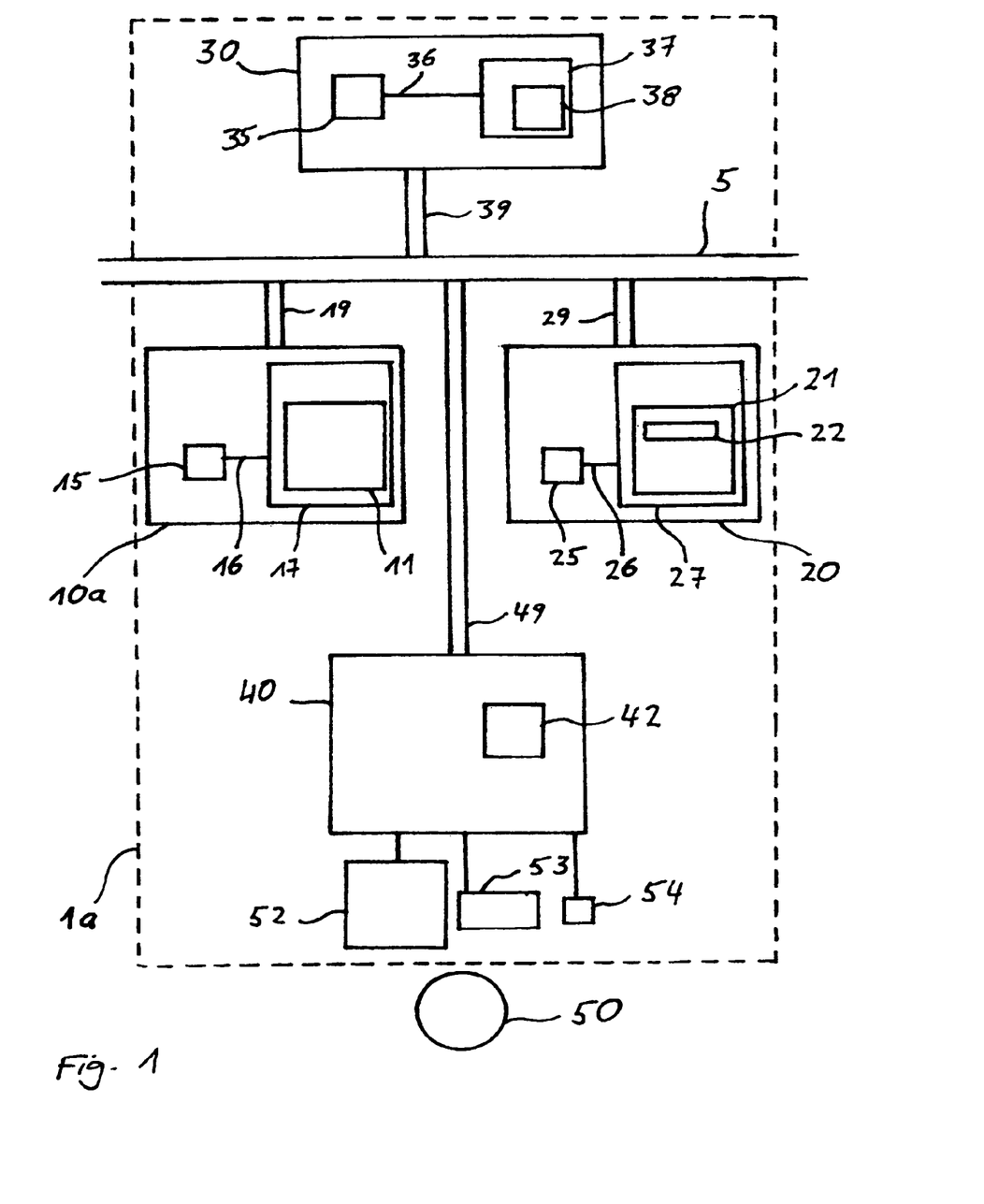
FIG. 1 shows an inventive computer system.

FIG. 1 shows a computer system 1a. A first server 10a has a processor 15 and a storage element 17 connected to the processor 15 via a bus system 16. A first network page 11 is stored in the storage element 17. The first server 10a is connected to a communications network, e.g. the Internet 5, via a data line 19.

A second server 20 also comprises a processor 25 and a storage element 27 connected to the processor 25 via a bus system 26. A second network page 21 is stored in the storage element 27 which comprises a link 22. The link 22 refers e.g. to the first network page 11. The second server 20 is also connected to the Internet 5 via a data line 29.

A third server 30 comprises a processor 35 and a storage element 37 connected to the processor 35 via a bus system 36. A computer program 38 is stored in the storage element 37. The computer program 38 realizes e.g. the functionality of the inventive server, i.e. in particular, the assessment and optimization of the link 22 and/or causes changes in the link 22 to be represented. The third server 30 is also connected to the Internet 5 via a data line 39.

A client 40 is connected to the Internet 5 via a data line 49. The client 40 may e.g. be designed as PC (personal computer) on which a browser runs. The client 40 is moreover associated with a monitor 52, a keyboard 53, and a mouse 54, which permit interaction between the user 50 and the client 40. It is feasible to design the client as a so-called Set-Top-Box.

Figure 2:
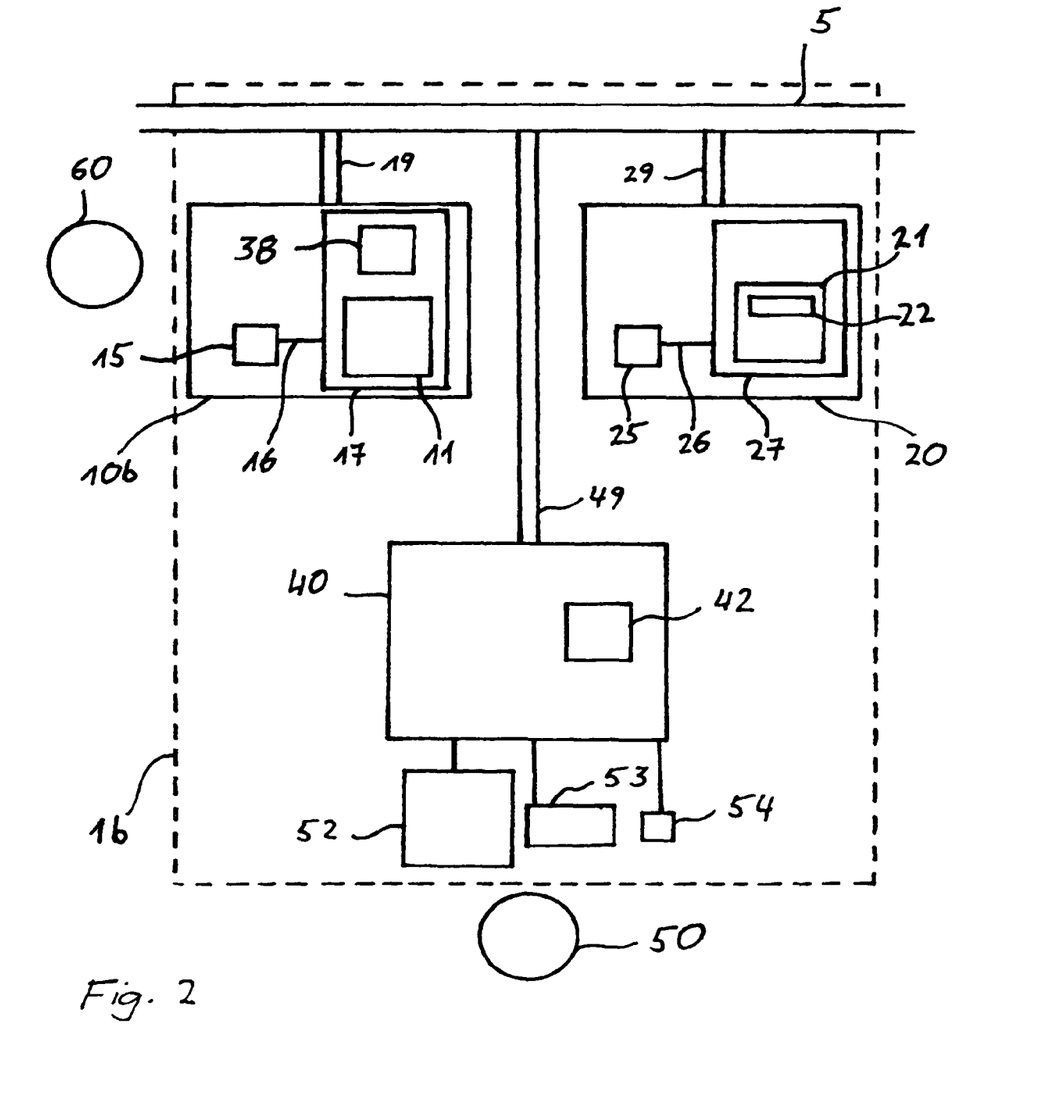
FIG. 2 shows an inventive computer system, wherein the third server is designed as software.

FIG. 2 shows a computer system 1b which comprises a first server 10b, a second server 20 and a client 40. The functionality of the inventive server is again realized by the computer program 38. The computer program 38 is, however, stored in the computer system 1b in the storage element 17 of the first server 10b thereby realizing the functionality of the third server 30 of FIG. 1 also within the first server 10b (FIG. 2). FIG. 2 also shows a user 60. The user 60 may e.g. be the operator of the first server 10b.

Figure 3:
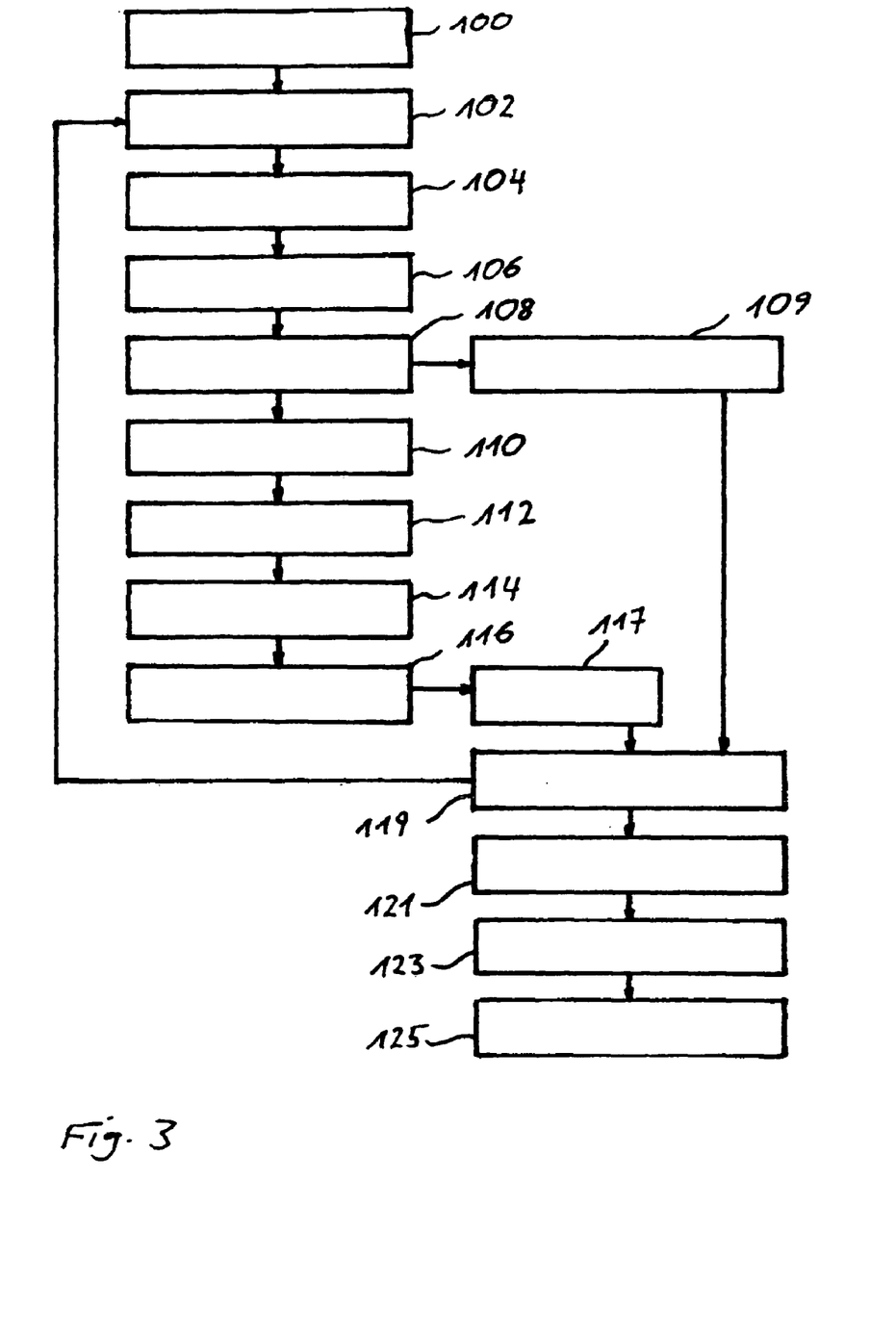
FIG. 3 shows an example of a flow chart of the inventive method.
Figure 4:
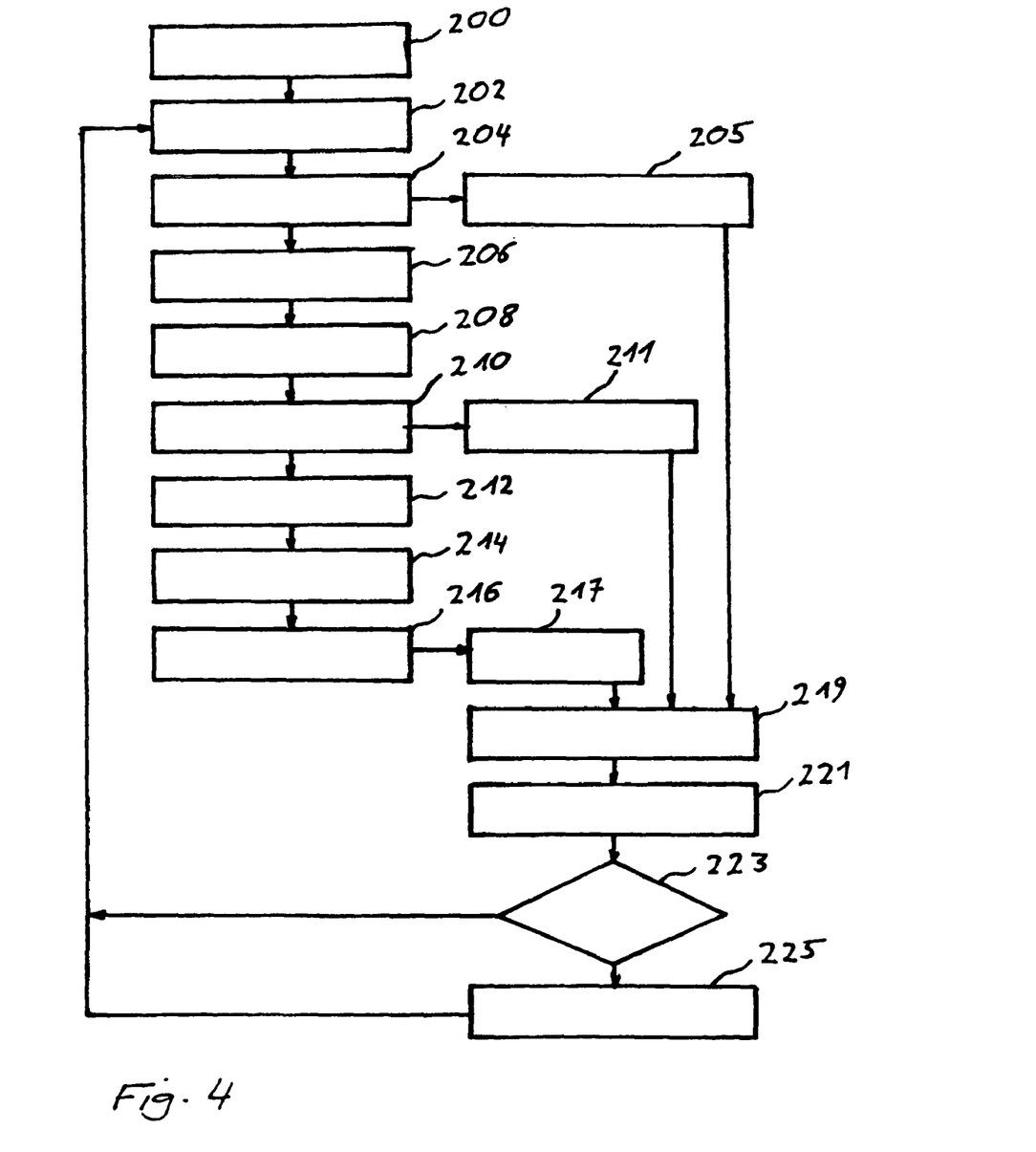
FIG. 4 shows an example of a flow chart of the inventive method, wherein the second server is designed as a search engine.

FIGS. 3 and 4 show examples for execution of the inventive method which is suitably based on the following scenario:

The user 60 operates the first server 10b via which the user 50 can order products or services. The second server 20 provides a network page 21 to be called which contains a link 22 to the first network page 11. This second network page 21 may e.g. be a purchasing port which represents the link 22 in dependence on a desired service or a certain branch. The second network page 21 can, of course, also be accessed via further links (not shown) on further network pages (not shown).

The method starts with step 100. In step 102, the user 50 requests the second network page 21 from the second server 20 via the client 40. This may occur e.g. through direct input of the URL associated with the second network page 21.

In step 104, the second server 20 causes transmission of the second network page 21 to the client 40. In step 106, the second network page 21 is interpreted by the browser 42 and is displayed to the user 50 via the monitor 52. The second network page 21 shows the link 22. The link may be associated with further text or graphical information which e.g. describe and graphically show a product.

In step 108, the user 50 activates the link 22 e.g. through pressing a key disposed on the mouse 54 (so-called click) causing the browser 42 to transfer information to the third server 38 in step 109. This information is e.g. the URL of the second network page 21, the URL of the first network page 11 selected through activation of the link 22, information with respect to a product or a product group associated with the link 22 (product identification), and optionally information which is suitable to identify the user 50 (user identification).

Activation of the link 22 also causes the client 40 to request the first network page 11 from the first server 10a, 10b (step 110) and transfer it to the client 40. The client 40 thereby communicates with the first server 10 e.g. via the data line 49, the Internet 5 and the data line 19.

The first server 10 causes the client 40 to set a so-called cookie in step 112. A cookie is a small file which is locally stored on the client 40 and contains information which gives e.g. information about the second network page 21, the first network page 11 and/or the user 50.

The user 50 selects further network pages offered by the first server 10a, 10b in step 114. These further network pages may typically be directly or indirectly accessed via links shown on the first network page 11 or other network pages. The further network pages offer e.g. further products or information.

The user 50 orders products or services or requests information in step 116 which may be effected e.g. through activation of a button provided therefor which is shown on a network page.

In step 117, the client 40 causes transfer of the data stored in the cookie to the first 10a, 10b and/or the third server 30, 38. It is possible e.g. to recognize through the cookie whether the user 50 which carries out an order in step 116, has reached the first network page 11 via the link 22 shown on the second network page 21 or has requested the first network page 11 in a different manner. The cookie typically also comprises date and running time. The date shows when the cookie was set. After expiration of the running time, the cookie is automatically deleted from the client 40. The running time consequently determines the period which can lapse between setting of the cookie, i.e. activation of the link 22, and e.g. order of a product, within which activation of the link 22 shall be associated with the user 50 ordering the product.

The link 22 is assessed in step 119 taking into consideration the data transmitted in steps 109 and 117. Through basic assessment of the link 22, e.g. all activations (clicks) of the link 22 could be added up within a predeterminable time period. It is also feasible to assess the link 22 in dependence on the turnover which was carried out on the first server by users who have selected the first network page 11 through activation of the link 22. Assessment may, in particular, also include the data of a merchandise information system. A link 22 may e.g. be assessed as particularly low if it refers to products which are currently not available or the delivery of which is difficult. On the other hand, a link 22 may be assessed as high if the products associated therewith can be offered at a particularly favorable price, have a short delivery term or a high profit margin.

The results of the assessment of the link 22 are provided to the user 60 in step 121 e.g. via an automatically generated e-mail. The results of the assessment of the link 22 may also be stored in a region of the storage element 37 of the third server 30 or in a region of the storage element 17 of the first server 10a, 10b, wherein the user 60, e.g. the operator of the first server 10a, 10b has access to these results.

The user 60 changes or removes the link 22 to the network page 21 in step 123, e.g. by transmitting a corresponding request to the operator of the second server 20. The second server 20 may provide the user with an interface, e.g. in the form of an Internet port which permits the user 60 to change or remove the link 22 e.g. by reducing the text associated with the link 22, adding details and/or adding graphics.

In the embodiment shown in FIG. 3, the link 22 is removed from the network page 21 in step 125. As mentioned above, it is feasible to merely change it or leave it unchanged. If the link 22 is an advertising banner, this advertising banner may be replaced by another more effective advertising banner.

FIG. 4 shows a flow chart of a further embodiment of the inventive method. In this embodiment, the second server 20 is associated with a search engine which generates a list with links to network pages which can be associated with the transmitted search terms, in dependence on one or more transmitted search terms. Search engines are used e.g. to obtain a list of providers which sell a product which can be determined by search terms. Search engines can be accessed on the Internet e.g. under www.google.de, www.lycos.de and www.altavista.com. The results determined by the search engine in dependence on a search term are transmitted to the user 50 in a HTML document designed as a hit list. The user 50 can activate the links shown on the hit list and request the corresponding network pages.

The flow chart shown in FIG. 4 starts in step 200. In step 202, the user 50 requests a network page from the second server 20, which comprises a text entry field into which the user enters a search term via the keyboard 53.

The client 40 causes transmission of the search term to the second server 20 in step 204. In step 205, data which permits user identification, and the search term are transmitted to the third server 30. Moreover, a cookie can be generated by the second server 20 or the third server 30, be transmitted to the client 40 and be stored there. The cookie contains e.g. data, time and the search term.

The second network page 21 is generated on the second server 20 in step 206. The second network page 21 contains at least the link 22 which refers to the first network page 11 of the first server 10. The link may be generated in dependence on the search term. One or more search terms are each e.g. associated with one or more product(s) or product group(s)) which are offered by the first server 10. If such a search term is transmitted to the search engine via the client 40, the second network page shows links to all products or product groups which are associated with this search term. A so-called product database may thereby be stored in the search engine or in the first server 10, which contains association of search terms and products or product groups.

The second network page 21 is transmitted to the client 40 in step 208 and displayed to the user 50.

In step 210, the user 50 activates the link 22 whereby the client 40 transmits the request of the first network page 11 to the first server 10a, 10b. In step 211, information is transmitted to the first server 10a, 10b and/or to the third server 30, which permit identification of the user 50 (user identification) and identification of the second server 20 (the URL associated with the second network page 21).

In step 212, the first network page 11 is transmitted by the first server 10a, 10b to the client 40 via the Internet 5. In step 214, the first network page 11 is interpreted by the browser 42 and displayed on the monitor 52. The first network page 11 contains e.g. illustrations and descriptions of various products which can be ordered by the user 50 through activation of a corresponding button. In step 216, the user 50 orders a product.

Information with respect to the user 50 (user identification) and/or to the ordered product (product identification) is transmitted to the third server 30 in step 217.

The link 22 displayed on the second network page 21 is assessed in step 219 advantageously using information which was transmitted in steps 205, 211 and 217. The link 22 can be assessed analogously to the methods shown in step 119 in FIG. 3.

The link 22 will, in particular, be assessed in dependence on several bits of information. It may e.g. be reasonable to cause the second server 20 to display the link 22 associated with a product which is available in low quantities but involves high profit even more frequently on the network page 21, to provide a larger and more striking graphic representation of the advertising banner or e.g. associate the product or a product group comprising this product with further search terms in the product database. The cost to be paid by the operator of the first server 10a, 10b to the operator of the second server 20 for displaying this link may be taken into consideration in the assessment of this link 22.

Such information concerning products and product groups may also be provided by a merchandise information system. Merchandise information systems may e.g. be information systems provided by a further server which generate, administrate and provide, in addition to a plurality of information concerning the products and product groups, further information, such as e.g. statistics and prognoses concerning this information. Merchandise information systems may provide e.g. the availability of the product or a number of cancellations of orders of the product.

It is particularly advantageous for the inventive method that the plurality of information concerning the link 22, the user 50, the product and the product group may be used in arbitrary combination to assess the link 22. Towards this end, the use of methods from artificial intelligence may be advantageous.

The assessment of the link 22 is compared with one or more threshold values in step 221, which is/are e.g. predetermined by the user 60 and filed on the third server 30. Step 223 examines whether the link 22 on the second network page 21 should no longer be displayed or be changed in dependence on the result of the comparison, if the second network page 21 is again transmitted to a client by the second server.

If the search engine is suited to find one or more providers for a certain product, each provider is again associated with an amount of search terms and each search term is again associated with one or more products or product groups. It is advantageous to display links which refer only to such network pages which are actually of interest to a user 50. This permits, in particular, a reduction in the amount of data on the network page transmitted to the client 40.

If the examination carried out in step 223 shows that display of the link 22 transmitted in step 204 is to be continued, the method is continued in step 202. If the examination in step 223 shows that display of the link 22 should be stopped or changed, the search engine associated with the second server 20 is automatically caused to delete the link from the number of links associated with the first server 10a, 10b or to replace it by another link followed by continuation of the method in step 202.

The result of the examination may also provide that the association of the products or product groups with individual or several search terms is changed. Towards this end, the entries in the product database may be automatically changed. In dependence on the examination result, it is possible to reduce the amount of search terms associated with a product or product group or increase this amount by further search terms. Conversely, the amount of the products or product groups associated with a search term is also changed. A product which is available in large amounts and with particular ease and has a high profit margin and is sold very often, may be associated with further search terms. On the other hand, the number of search terms associated with a product which is only rarely bought, can be reduced. This may cause a product (product group) to no longer be associated with a search term, which means that no search terms are associated with the product (product group).

Figure 5:
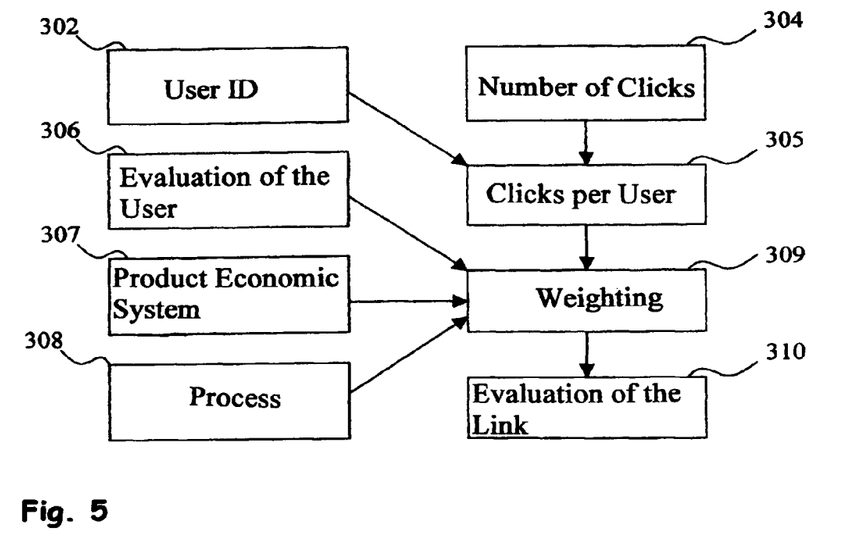
FIG. 5 shows a schematic representation of method steps for carrying out an inventive assessment of a link.

FIG. 5 shows the assessment of the link 22 in a schematic and exemplary manner. A user identification is provided by a function unit 302 which permits association of each activation of the link 22 with the user causing the activation, e.g. the user 50.

The number of all activations of the link 22 carried out within a predeterminable time period is determined and provided in a function unit 304 using e.g. the data transmitted in steps 109 or 211 of FIGS. 3 and 4, respectively.

The number of activations of the link 22 per user is determined in a function unit 305. Towards this end, the total number of activations from the function unit 304 and the user identification from the function unit 302 associated with each activation are used.

The function unit 306 provides assessment of a user, e.g. the user 50. Assessment of the user 50 may e.g. involve the payment reliability or products or product groups (books, food, etc.) which this user 50 orders very frequently.

Information of a merchandise information system is provided in a function unit 307.

The function unit 308 suitably processes and provides information about the process shown in steps 116 and 216 of FIGS. 3 and 4, respectively, (e.g. order of a product, selection of further network pages from the first server 10a, 10b). Towards this end, the function unit 308 uses e.g. the data transmitted in steps 117 and 217 of FIGS. 3 and 4. The function unit 308 may provide information for each finished process concerning the type of process (order/purchase of information, goods, services, etc.), the turnover achieved and the user.

A function unit 309 weights the activations of the link 22 per user using information provided by the function units 305, 306, 307 and 308, wherein the activations a carried out by a user A are e.g. not assessed (0·a) if the user A has not ordered. The number of activations b of the link 22 carried out by a user B is e.g. assessed as of little importance (0.5·b) if the user B is constantly in arrears with payment. The activations c of the link 22 carried out by a user C are assessed as highly important (2·c) if the user C effects particularly high turnovers via the network pages of the first server 10a, 10b.

The actual assessment of the link 22 is carried out in the function unit 310 through suitable combination of the information provided by the function unit 309. This is effected e.g. through addition of the data provided by the function unit 309 (0·a+0.5·b+2·c). The link 22 may, of course, also be weighted and assessed exclusively through information from the merchandise information system of the function unit 307.

Figure 6:
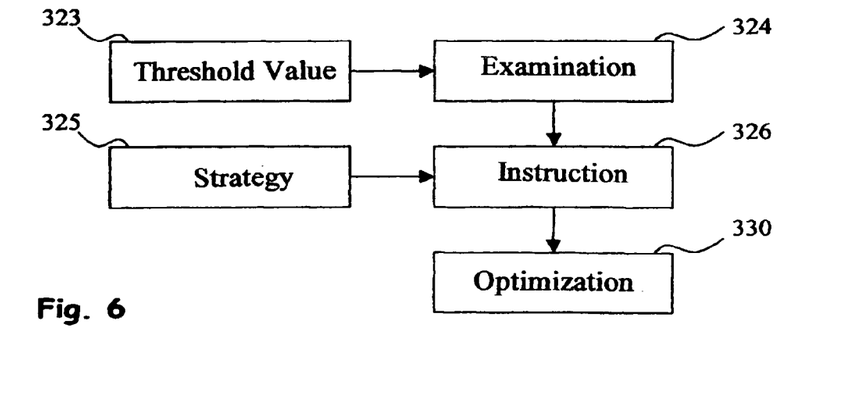
FIG. 6 shows a schematic representation of method steps for optimizing an assessed link.

FIG. 6 schematically shows function units which can be used to optimize the link 22. A function unit 324 examines whether the assessed link 22 shall be optimized using a threshold value provided by the function unit 323. If the function unit 324 determines that the assessment of the link 22 is below the threshold value provided by the function unit 323, the function unit 324 may effect optimization of the link 22. Towards this end, instructions are generated in a function unit 326 in dependence on a strategy provided by a function unit 325.

If the link 22 is e.g. associated with a number of search terms on a search engine, the strategy may provide removal or exchange of individual search terms associated with a product or a product group within a product database.

If the link 22 is e.g. a graphic advertising banner, the strategy may also provide that the advertising banner is removed or replaced by another, more effective advertising banner. A link 22 with text may also be replaced by a representation with differently designed text. If the link 22 is directly associated with a product, the product description may, in particular, be adjusted or another price associated with the product may be stated.

The function unit 326 generates instructions of a suitable format in dependence on the strategy which are transmitted to the second server 20. A suitable format may e.g. be instructions for a database located on the second server, e.g. (SQL) (Structured Query Language). The database may e.g. be the product database or communicate with the product database.

The link 22 is optimized in a function unit 330. Towards this end, the instructions generated by the function unit 326 are carried out, such as e.g. removal from or change of the link 22 of the database associated with the second server 20 or change of the search terms associated with a product or a product group.

It is, of course, possible to also take into consideration further information for the assessment 310 of the link 22, examination 324 of the assessment or generation 326 of the instructions, which involves, in particular, the above-mentioned information concerning the product and/or product group.

The result of the examination generated for the function unit 324 may also be provided in a suitable form (e.g. via e-mail or via a port) to the user 60 for assessment of the link. In this case, the user 60 could automatically effect optimization of the link 22.

Another embodiment could provide assessment of the link 22 without weighting 309. In this case, the function units 309, 306 could e.g. be omitted.

It is possible to change or omit individual steps or add new steps in the flow charts shown in FIGS. 3 and 4 of embodiments of the inventive method. Several cookies from the first 10a, 10b, the second 20 and/or third 30, 38 server may be set for the user 50 which would provide an even more exact analysis of the behavior of the user 50 and more precise selection and design of the links shown on the second network page 21.

I claim:

1. A method for optimizing a link to a first network page of a first server, the link being associated with at least one of textual information or graphical information that is related to at least one of a product or a group of products being offered for purchase, the method comprising the steps of:
    a) associating a user ID to each of a plurality of users, each user having received the link together with a second network page on a user's client from a second server, the user ID being realized through a cookie generated by one of the servers and stored on the user's client, the cookie containing information about the first network page, the second network page and/or the user;
    b) determining a number of activations of the link per user for the plurality of users using information contained in the cookie stored on the user's client;
    c) assessing each user of the plurality of users with respect to at least one criteria, the criteria selected from the group consisting of how long the user is a customer to an online shop that is associated with the first server, a turnover generated by the user and a number of products ordered by the user from the online shop;

d) weighting the number of activations of the link per user for the plurality of users based on the results of step c);

e) assessing the link based on the weighted number of activations of the link determined in step d); and f) determining, based on the results of step e), for future requests of the second network page by the user, at least one of how the link is to be displayed on the second network page, whether the link is to be displayed on the second network page at all and how at least one search term that is associated with the link or the product should be modified, in order to optimize the link by making it more interesting for the user.

2. The method of claim 1, wherein assessing the link is further based on a criteria describing an availability of a product that is associated with the link.

3. The method of claim 1, wherein assessing the link is further based on a criteria defining whether a product that is associated with the link is available as a special offer.

4. The method of claim 1, wherein assessing the link is further based on a criteria that is related to the product or the product group, wherein the criteria is provided by a merchandise information system.

5. The method of claim 1, wherein a result of assessing the link is a numerical value and optimization of the link is performed depending on a comparison of the numerical value to at least one threshold value.

6. The method of claim 1, wherein at least one of the steps of assessing the users, weighting the number of activations and assessing the link is performed by a third server.

7. The method of claim 1, wherein the second server is a search engine.

8. The method of claim 1, wherein a result of assessing the link is automatically stored to be retrievable by a system administrator.

9. A computer system having a computer readable storage device containing instructions for carrying out the method of claim 1.

10. A device for optimizing a link to a first network page of a first server, the link being associated with at least one of textual information or graphical information that is related to at least one of a product or a group of products being offered for purchase, the device comprising:

means for associating a user ID to each of a plurality of users, each user having received the link together with a second network page on a user's client from a second server, the user ID being realized through a cookie generated by one of the servers and stored on the user's client, the cookie containing information about the first network page, the second network page and/or the user;

means for determining a number of activations of the link per user for the plurality of users using information contained in the cookie stored on the user's client;

means for assessing each user of the plurality of users with respect to at least one criteria, the criteria selected from the group consisting of how long the user is a customer to an online shop that is associated with the first server, a turnover generated by the user and a number of products ordered by the user from the online shop;

means for weighting the number of activations of the link per user for the plurality of users based on previous assessment of each user;

means for assessing the link based on a weighted number of activations of the link; and means for determining, for future requests of the second network page by the user, at least one of how the link is to be displayed on the second network page, whether the link is to be displayed on the second network page at all and how at least one search term that is associated with the link or the product should be modified, in order to optimize the link by making it more interesting for the user.

* * * * *